US011339665B2

(12) United States Patent
Hart et al.

(10) Patent No.: US 11,339,665 B2
(45) Date of Patent: May 24, 2022

(54) BLADE AND AIRFOIL DAMPING CONFIGURATIONS

(71) Applicant: General Electric Company, Schenectady, NY (US)

(72) Inventors: Andrew Clifford Hart, Greenville, SC (US); Jing Li, Niskayuna, NY (US); Suryarghya Chakrabarti, Niskayuna, NY (US); James Tyson Balkcum, III, Taylors, SC (US); Markus Feigl, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 16/816,568

(22) Filed: Mar. 12, 2020

(65) Prior Publication Data
US 2021/0285330 A1 Sep. 16, 2021

(51) Int. Cl.
*F01D 5/16* (2006.01)
*F01D 5/18* (2006.01)

(52) U.S. Cl.
CPC .................. *F01D 5/16* (2013.01); *F01D 5/18* (2013.01); *F05D 2220/30* (2013.01); *F05D 2240/30* (2013.01); *F05D 2260/221* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 994,166 A * | 6/1911 | Kienast | F01D 5/147 416/233 |
| 3,810,286 A * | 5/1974 | Kaufman, Sr. | B21H 7/16 29/889.72 |
| 6,752,594 B2 | 6/2004 | Miller et al. | |
| 6,983,608 B2 * | 1/2006 | Allen, Jr. | F01D 9/065 60/798 |
| 7,399,159 B2 * | 7/2008 | Matheny | F01D 5/147 416/62 |
| 7,607,287 B2 * | 10/2009 | Reba | F01D 9/02 415/115 |
| 7,766,621 B1 | 8/2010 | Maggs et al. | |
| 8,337,158 B1 * | 12/2012 | Liang | F01D 5/20 416/97 R |
| 8,979,498 B2 | 3/2015 | Mazzola et al. | |
| 9,784,133 B2 * | 10/2017 | Karafillis | F01D 9/042 |

(Continued)

*Primary Examiner* — Igor Kershteyn
*Assistant Examiner* — Jason Fountain
(74) *Attorney, Agent, or Firm* — Charlotte Wilson; Hoffman Warnick LLC

(57) ABSTRACT

The present embodiments set forth a blade including an airfoil, the airfoil including a tip cap, a pressure sidewall and a suction sidewall extending axially between corresponding leading and trailing edges and radially between the base and the tip cap. The blade, including the airfoil and base, being formed in at least two airfoil parts, each of the two airfoil parts including contacting edges engaging each other respective contacting edges, the contacting edges defining a joint for preloading each of the at least two parts with each other and with the base. The at least two airfoil parts forming the airfoil being retained to each other by an interference fit at the joint. The interference fit providing frictional damping of vibrations in the blade during blade operation.

18 Claims, 10 Drawing Sheets

(56) References Cited

U.S. PATENT DOCUMENTS

| | | | |
|---|---|---|---|
| 10,280,759 B2* | 5/2019 | Murdock | ................ F01D 5/147 |
| 2005/0118028 A1* | 6/2005 | Matheny | ................ F01D 5/147 |
| | | | 416/219 R |
| 2008/0159856 A1* | 7/2008 | Moniz | .................... F01D 5/147 |
| | | | 415/198.1 |
| 2017/0343007 A1* | 11/2017 | Murdock | ................ F01D 5/147 |

* cited by examiner

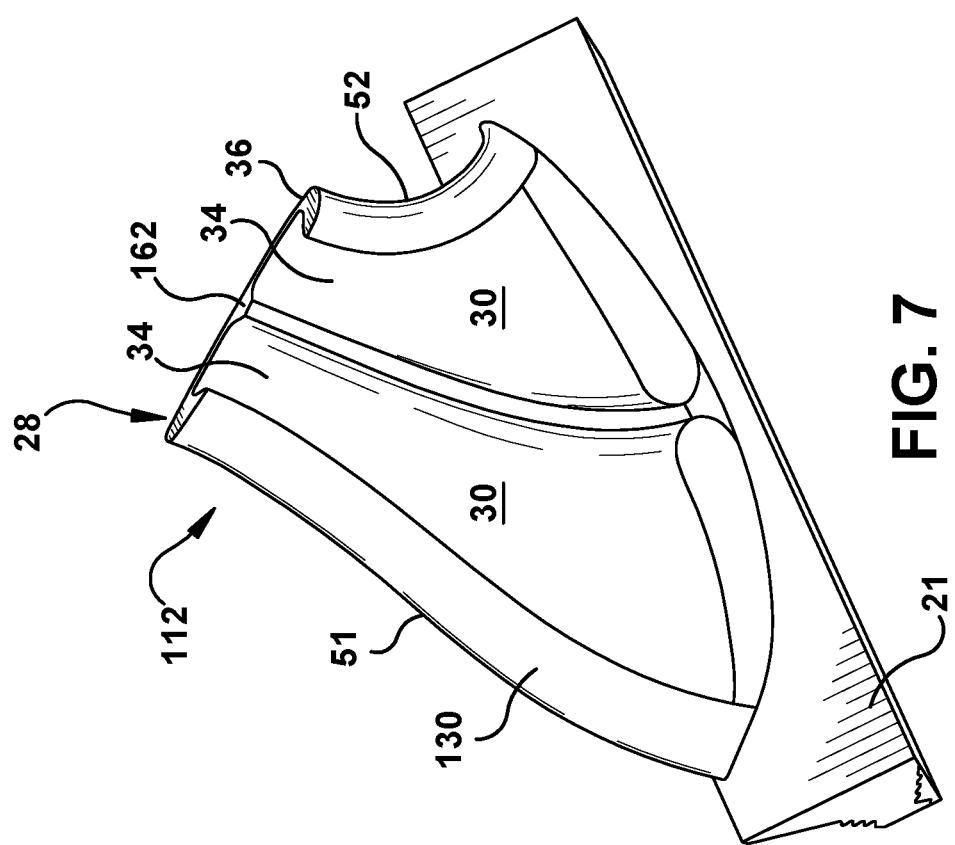

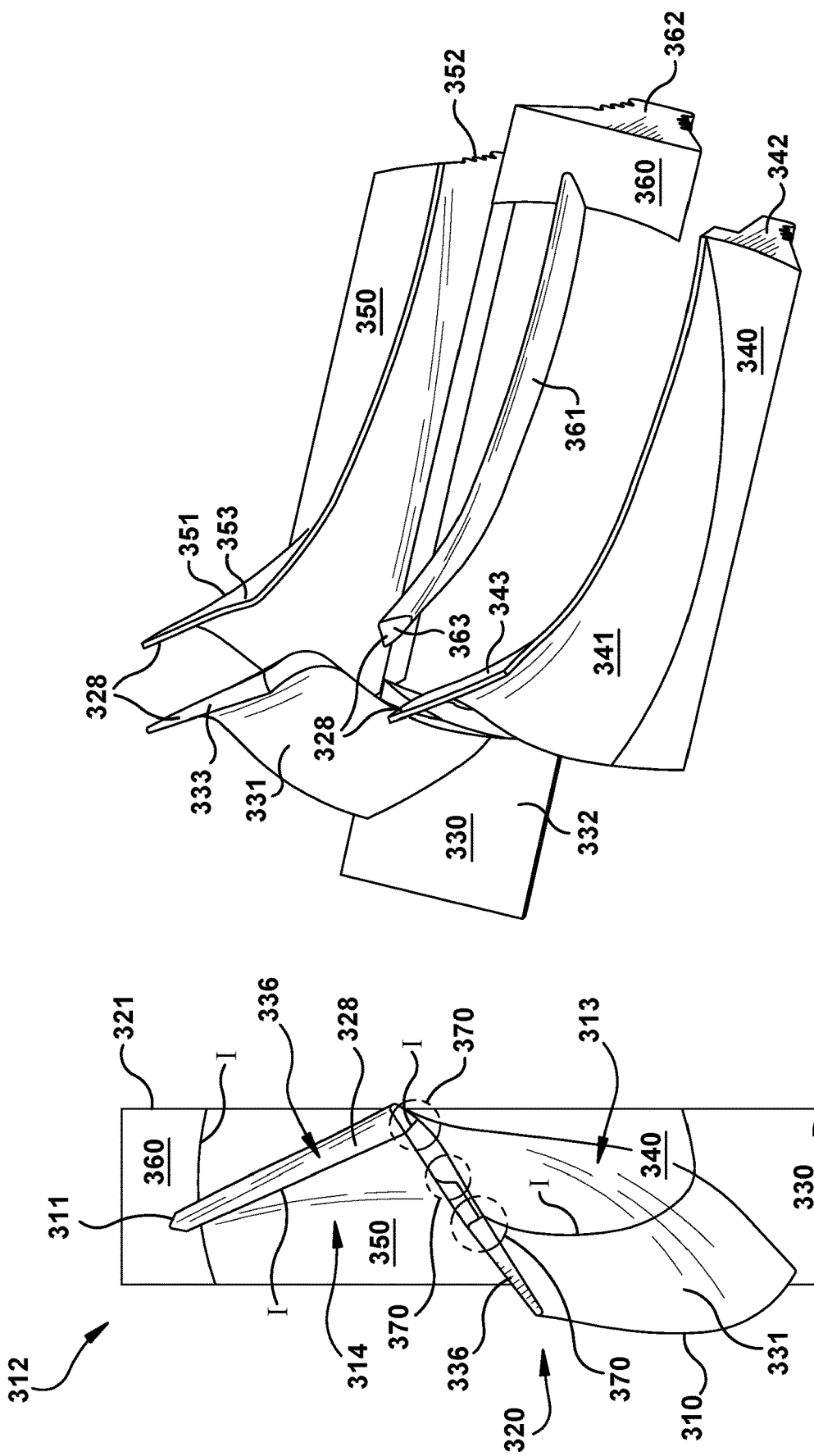

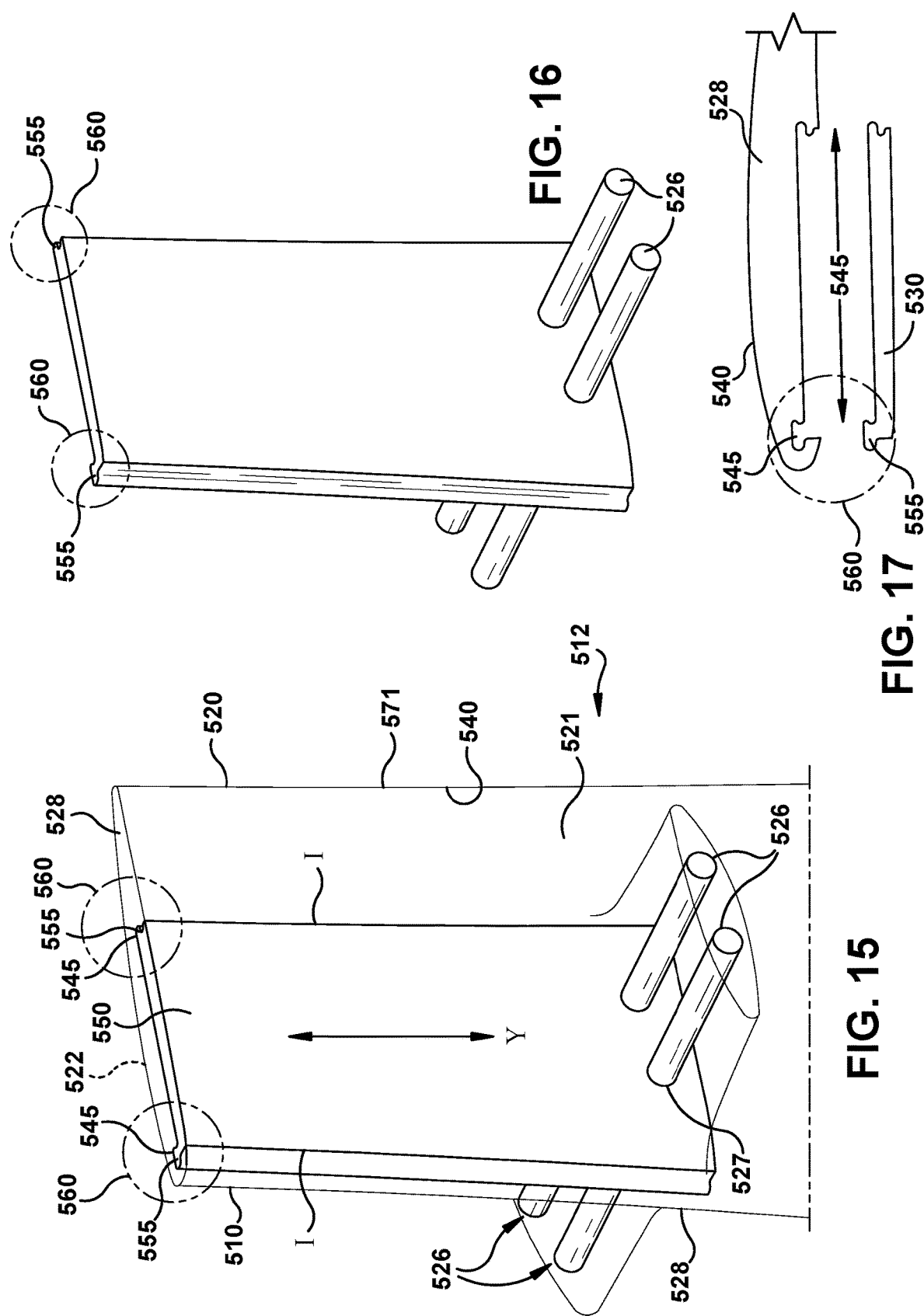

BLADE AND AIRFOIL DAMPING CONFIGURATIONS

This application was made with government support under contract number DE-FE0031613 awarded by the Department of Energy. The US government has certain rights in the invention.

BACKGROUND OF THE INVENTION

The present embodiments relate generally to apparatus, methods and/or systems concerning turbine rotor blades. More specifically, but not by way of limitation, the present disclosure relates to apparatus and assemblies pertaining to turbine rotor blades having multiple parts that provide damping.

BRIEF DESCRIPTION OF THE INVENTION

The present embodiments set forth a blade. The blade includes an airfoil including a tip cap, a pressure sidewall and a suction sidewall extending axially between corresponding leading and trailing edges and radially between the base and the tip cap. The blade, including the airfoil and base, being formed in at least two airfoil parts, each of the two airfoil parts including contacting edges engaging other respective contacting edges, the contacting edges defining a joint for preloading each of the at least two parts with each other and with the base. The at least two airfoil parts forming the airfoil being retained to each other by an interference fit at the joint. The interference fit providing frictional damping of vibrations in the blade during blade operation.

Another aspect of the embodiments sets forth a turbine engine including a blade. The blade includes an airfoil including a tip cap, a pressure sidewall and a suction sidewall extending axially between corresponding leading and trailing edges and radially between the base and the tip cap. The blade, including the airfoil and base, being formed in at least two airfoil parts, each of the two airfoil parts including contacting edges engaging other respective contacting edges, the contacting edges defining a joint for preloading each of the at least two parts with each other and with the base. The at least two airfoil parts forming the airfoil being retained to each other by an interference fit at the joint. The interference fit providing frictional damping of vibrations in the blade during blade operation.

These and other features of the present disclosure will become apparent upon review of the following detailed description of the preferred embodiments when taken in conjunction with the drawings and the appended claims.

The illustrative aspects of the present disclosure are developed to solve the problems herein described and/or other problems not discussed.

BRIEF DESCRIPTION OF THE DRAWINGS

These and other features of this embodiments will be more completely understood and appreciated by careful study of the following more detailed description of illustrative embodiments taken in conjunction with the accompanying drawings, in which:

FIG. 7 is an elevated exploded perspective view of the blade of FIG. 6 in accordance with aspects of the disclosure;

FIG. 10 is a top perspective view of still yet another blade in accordance with aspects of the disclosure;

FIG. 11 is an elevated exploded perspective view of the blade of FIG. 10 in accordance with aspects of the disclosure;

FIG. 15 is a side perspective view of a further blade in accordance with aspects of the disclosure;

FIG. 16 is a perspective view of a portion of the blade of FIG. 15 in accordance with aspects of the disclosure;

FIG. 17 is a top perspective view of the blade of FIG. 15 in accordance with aspects of the disclosure.

Figure 1:
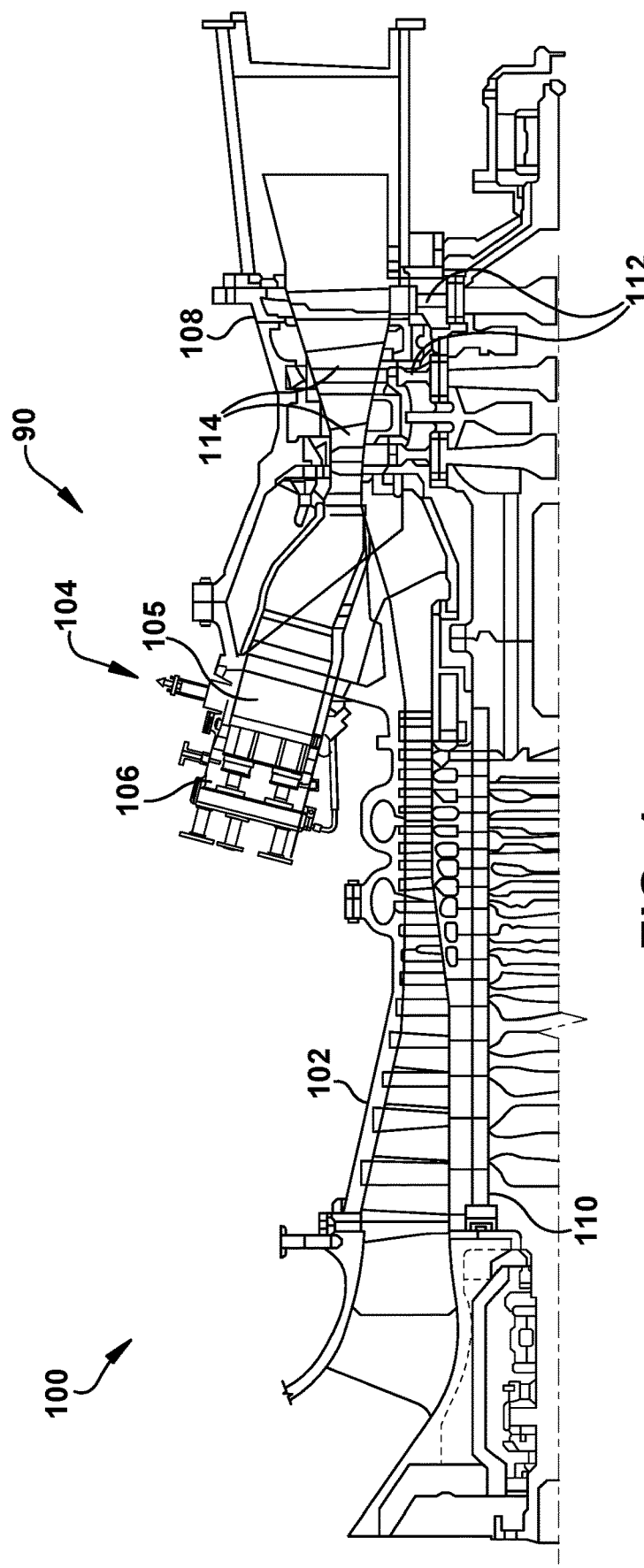
FIG. 1 is a schematic representation of an illustrative combustion turbine engine in which embodiments of the present disclosure may be used.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

While the following examples of the present embodiments may be described in reference to particular types of turbine engines, those of ordinary skill in the art will appreciate that the present embodiments may not be limited to such use and applicable to other types of turbine engines, unless specifically limited therefrom. Further, it will be appreciated that in describing the present embodiments, certain terminology may be used to refer to certain machine components within the gas turbine engine.

Whenever possible, common industry terminology will be used and employed in a manner consistent with its accepted meaning. However, such terminology should not be narrowly construed, as those of ordinary skill in the art will appreciate that often a particular machine component may be referred to using differing terminology. Additionally, what may be described herein as being single component may be referenced in another context as consisting of multiple components, or, what may be described herein as including multiple components may be referred to elsewhere as a single one. As such, in understanding the scope of the present embodiments, attention should not only be paid to the particular terminology, but also the accompanying description, context, as well as the structure, configuration, function, and/or usage of the component, particularly as may be provided in the appended claims.

Several descriptive terms may be used regularly herein, and it may be helpful to define these terms at the onset of this section. Accordingly, these terms and their definitions, unless stated otherwise, are as follows. As used herein, "downstream" and "upstream" are terms that indicate direction relative to the flow of a fluid, such as, for example, the working fluid through the compressor, combustor and turbine sections of the gas turbine, or the flow coolant through one of the component systems of the engine. The term "downstream" corresponds to the direction of fluid flow, while the term "upstream" refers to the direction opposite or against the direction of fluid flow. The terms "forward" and "aft", without any further specificity, refer to directions relative to the orientation of the gas turbine, with "forward" referring to the forward or compressor end of the engine, and "aft" referring to the aft or turbine end of the engine. Additionally, given a gas turbine engine's configuration about a central axis as well as this same type of configuration in some component systems, terms describing position relative to an axis likely will be used. In this regard, it will be appreciated that the term "radial" refers to movement or position perpendicular to an axis. Related to this, it may be required to describe relative distance from the central axis. In this case, for example, if a first component resides closer to the center axis than a second component, it will be stated herein that the first component is "radially inward" or "inboard" of the second component. If, on the other hand, the first component resides further from the axis than the second component, it may be stated herein that the first component is "radially outward" or "outboard" of the second component. Additionally, it will be appreciated that the term "axial" refers to movement or position parallel to an axis. And, finally, the term "circumferential" refers to movement or position around an axis.

Air is pressurized in a compressor of a gas turbine engine and mixed with fuel in a combustor to generate hot combustion gases. These gases flow downstream through one or more turbines where energy is extracted. In a typical turbine, a row of circumferentially spaced-apart rotor blades extend radially outwardly from a supporting rotor disk. Each blade includes a root, an airfoil, and a platform positioned in the transition area between the root and the airfoil. The roots of the blades are received in complementary shaped recesses within the disk. The platforms of the blades extend laterally outward and collectively form a flow path for fluid passing through the rotor stage. The forward edge of each blade is generally referred to as the leading edge and the aft edge as the trailing edge. Forward is defined as being upstream of aft in the gas flow through the engine.

The airfoil has a generally concave pressure side and generally convex suction side extending axially between corresponding leading and trailing edges and radially between a root and a blade tip. The blade tip is closely spaced in relation to an outer turbine shroud for minimizing leakage of the combustion gases flowing downstream between the turbine blades. Maximum efficiency of the engine is obtained by minimizing the tip clearance, but is limited by the differential thermal and mechanical expansion and contraction coefficients between the rotor blades and the turbine shroud. Sufficient spacing must be maintained in order to minimize the occurrence of undesirable contact between the blade tip and the turbine shroud.

One concern in turbine operation is the tendency of turbine blades to experience vibrational stress during operation. In many installations, turbines are operated under conditions of frequent acceleration and deceleration. During acceleration or deceleration of the turbine, the blades are, momentarily at least, subjected to vibrational stresses at certain frequencies and in many cases to vibrational stresses at secondary or tertiary frequencies. When a blade is subjected to vibrational stress, its amplitude of vibration can readily build up to a point which may alter operations.

During operation, blades may be also excited into vibration by a number of different operational and dynamic factors. Variations in gas temperature, pressure, and/or density, for example, can excite vibrations throughout the rotor assembly, especially within the blade airfoils. Gas exiting upstream turbine and/or compressor sections in a periodic, or "pulsating" manner can also excite undesirable vibrations. In addition to these sources of vibration described above, the passing of nozzles/blades relative to adjacent blades/nozzles will cause aerodynamic disturbances at certain frequencies that lead to vibrations and stresses. These vibrations may cause undesirable stress on a blade and perhaps reduce its life.

Blades can be damped to avoid vibration. For example, it is known that dampers may be attached to an external surface of the airfoil. A recognized disadvantage of adding a damper to an external surface is that the damper is exposed to the harsh, corrosive environment within the engine. As soon as the damper begins to corrode, its effectiveness is compromised.

Generally, referring to the drawings, FIG. 1 is a schematic view of an illustrative turbomachine 90 in the form of a combustion turbine or gas turbine (GT) system 100 (hereinafter 'GT system 100'). GT system 100 includes a compressor 102 and a combustor 104. Combustor 104 includes a combustion region 105 and a fuel nozzle assembly 106. GT system 100 also includes a turbine 108 and a common compressor/turbine shaft 110 (hereinafter referred to as 'rotor 110'). In one embodiment, GT system 100 is a 7HA.03 engine, commercially available from General Electric Company, Boston, Mass. The present disclosure is not limited to any one particular GT system and may be implanted in connection with other engines including, for example, the other HA, F, B, LM, GT, TM and E-class engine models of General Electric Company, and engine models of other companies. Further, the teachings of the disclosure are not necessarily applicable to only a GT system, and may be applied to other types of turbomachines, e.g., steam turbines, jet engines, compressors, etc.

Figure 2:
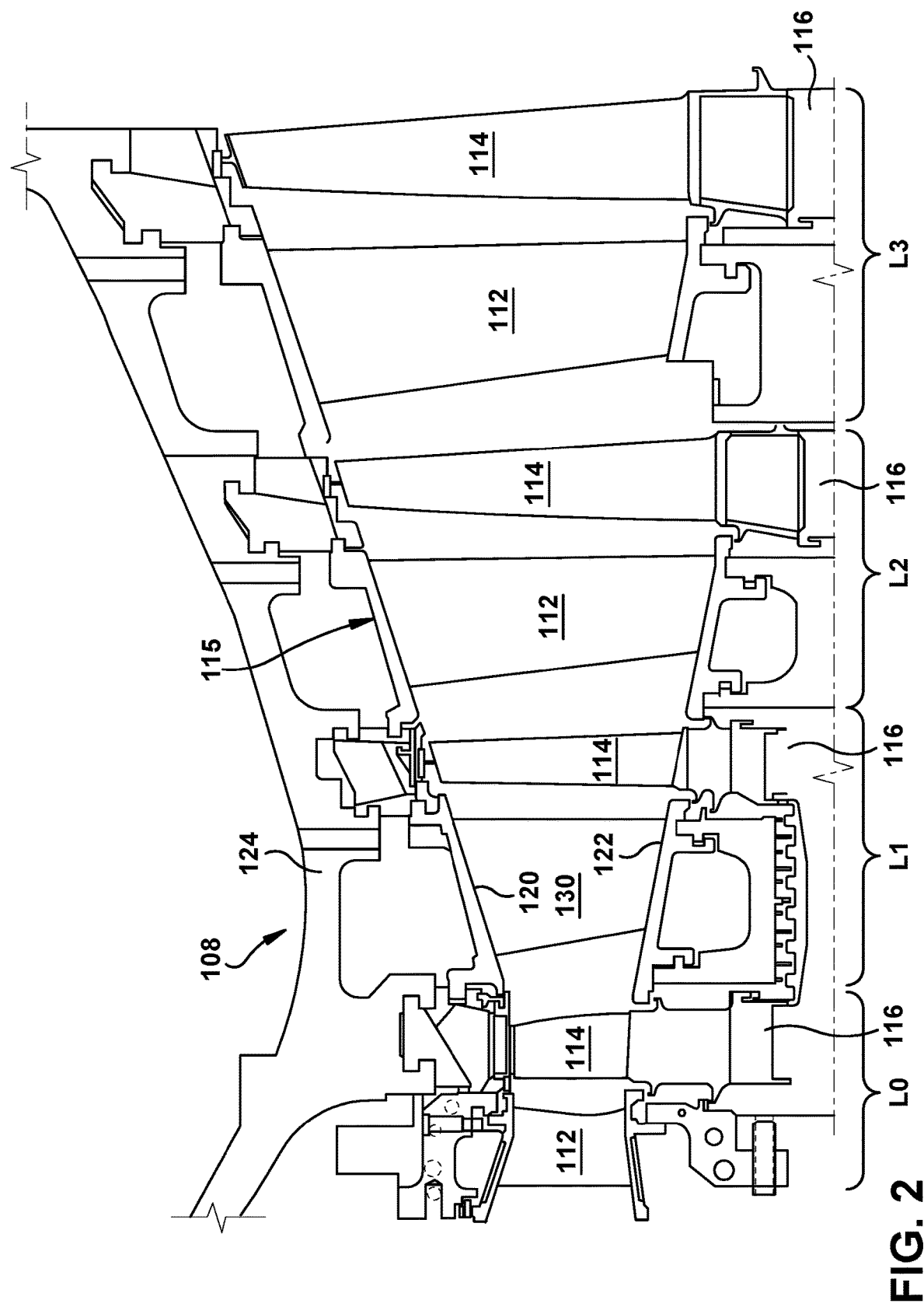
FIG. 2 is a cross-section illustration of an illustrative gas turbine assembly that may be used with the turbomachine in FIG. 1.

FIG. 2 is a cross-section view of an illustrative portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction) of the four stages. It is to be understood that four stages are shown as one example only, and each turbine may have more or less than four stages. A set of stationary vanes or nozzles 112 cooperate with a set of rotating blades 114 to form each stage L0-L3 of turbine 108, and to define a portion of a flow path through turbine 108. Rotating blades 114 in each set are coupled to a respective rotor wheel 116 that couples them circumferentially to rotor 110. That is, a plurality of rotating blades 114 are mechanically coupled in a circumferentially spaced manner to each rotor wheel 116. A static blade section 115 includes a plurality of stationary blades 112 circumferentially spaced around rotor 110. Each blade 112 may include at least one endwall (or platform) 120, 122 connected with airfoil 130. In the example shown, blade 112 includes a radially outer endwall 120 and a radially inner endwall 122. Radially outer endwall 120 couples blade(s) 112 to a casing 124 of turbine 108.

In operation, air flows through compressor 102 and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106. In the following discussion, unless otherwise indicated, only one of each component will be discussed. At least one end of turbine 108 may extend axially away from rotating shaft 110 and may be attached to a load or machinery (not shown) such as, but not limited to, a generator, and/or another turbine.

Various aspects of the embodiments will now be described with reference to FIGS. 3-17. Where possible, like reference characters and numerals will be used to connote like elements.

Figure 3:
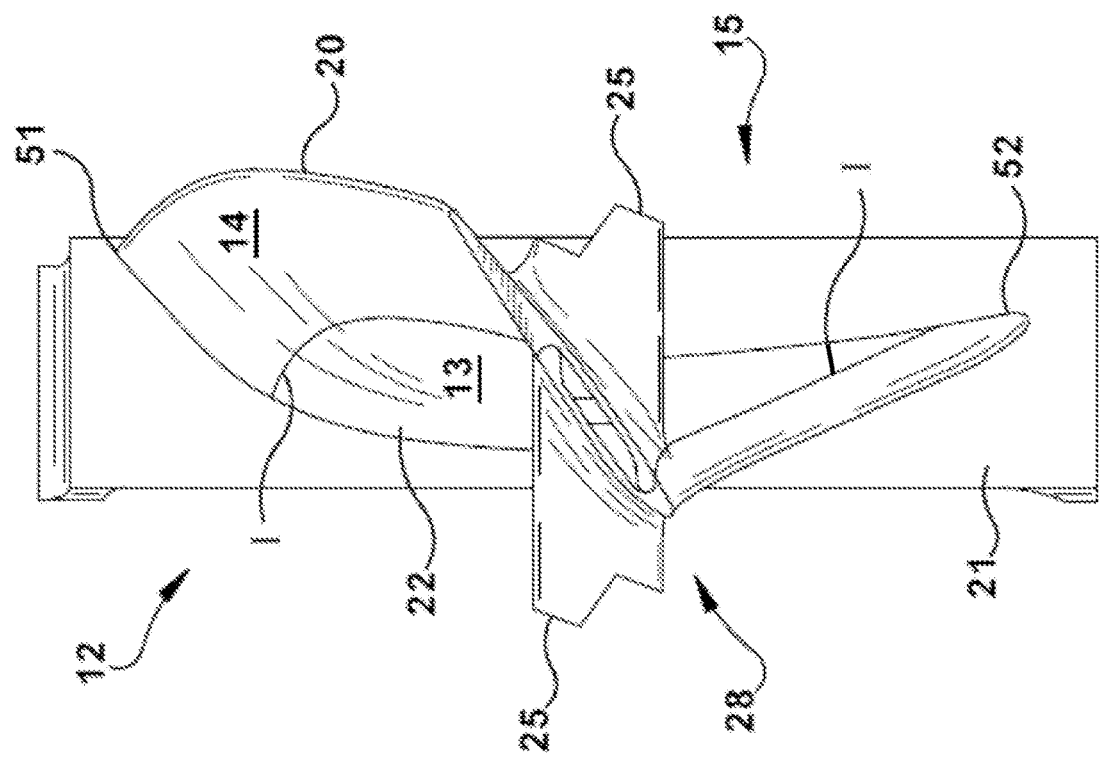
FIG. 3 is a top perspective view of a blade in accordance with aspects of the disclosure.

Blade 12 in FIG. 3 (similar to blade reference character 114 in FIGS. 1 and 2) includes an airfoil 15 with a generally concave pressure sidewall 20 (back side of the airfoil 15 as illustrated) and an opposite, generally convex, suction sidewall 22 extending between opposite leading and trailing edges 51 and 52, respectively. Suction side and pressure side sidewalls also extend in the radial direction between a base 21, which connects to rotor wheel 116 and an outer tip 28.

The inside of airfoil 15 may have an internal cooling configuration. The internal cooling configuration may include, for example, at least one internal flow channel 30 (illustrated in dashed lines for facilitating description of the embodiments) for channeling cooling air through the airfoil 15, for example serpentine flow channels. Some internal cooling flow channels 30 (not illustrated for facilitating illustration and description of the embodiments) may be provided with turbulators formed therein for improving cooling air effectiveness. Cooling air from internal cooling flow channels 30 may be discharged through a corresponding number of cooling holes.

Airfoil 15 in FIG. 3 is provided with snubber shrouds 25; however, snubber shrouds are not required on blades 12. Snubber shrouds 25 are provided on airfoil 15 and comprise a pair of part-span connectors extending from airfoil 15 at both the suction side and pressure side. Each of the pair of snubber shrouds 25 can be sized to complement and engage a corresponding part-span connector on an adjacent blade. The snubber shrouds may be provided on airfoils 15, especially when the airfoils are large, to provide stability and integrity between the airfoils and the rows of airfoils in the turbine system 10. While FIG. 3 illustrates airfoil 15 including snubber shrouds 25, embodiments of the disclosure are applicable with or without airfoil 15 including snubber shrouds 25.

Figure 4:
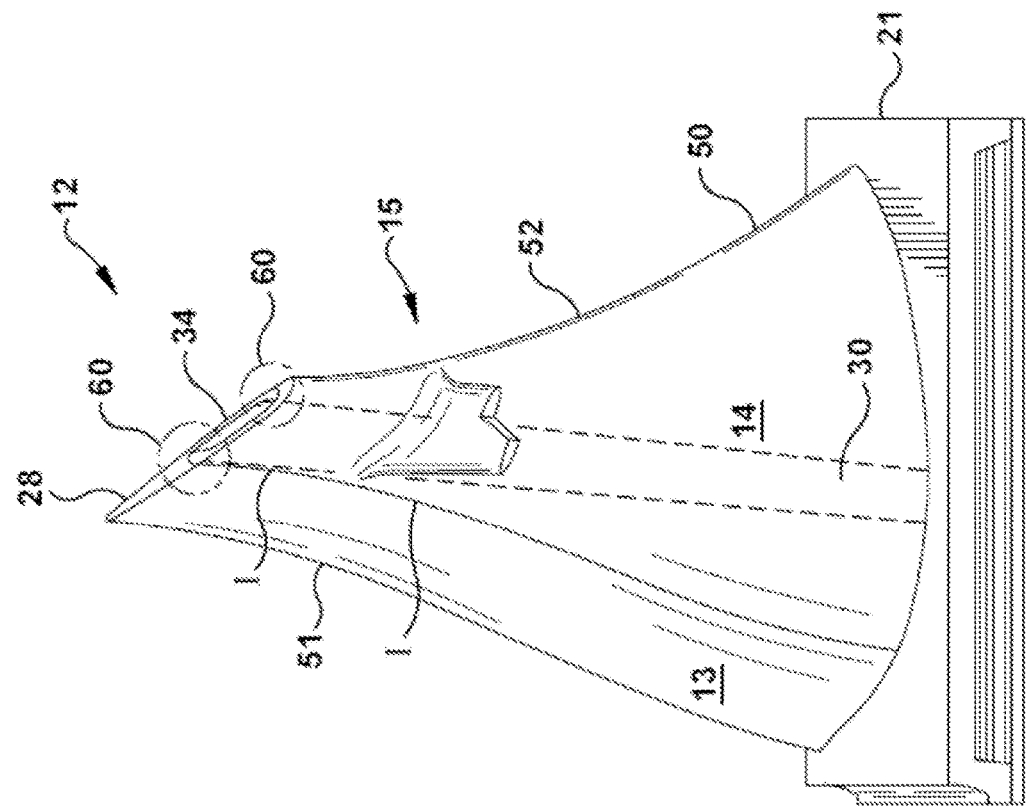
FIG. 4 is a side perspective view of a blade in accordance with aspects of the disclosure.
Figure 5:
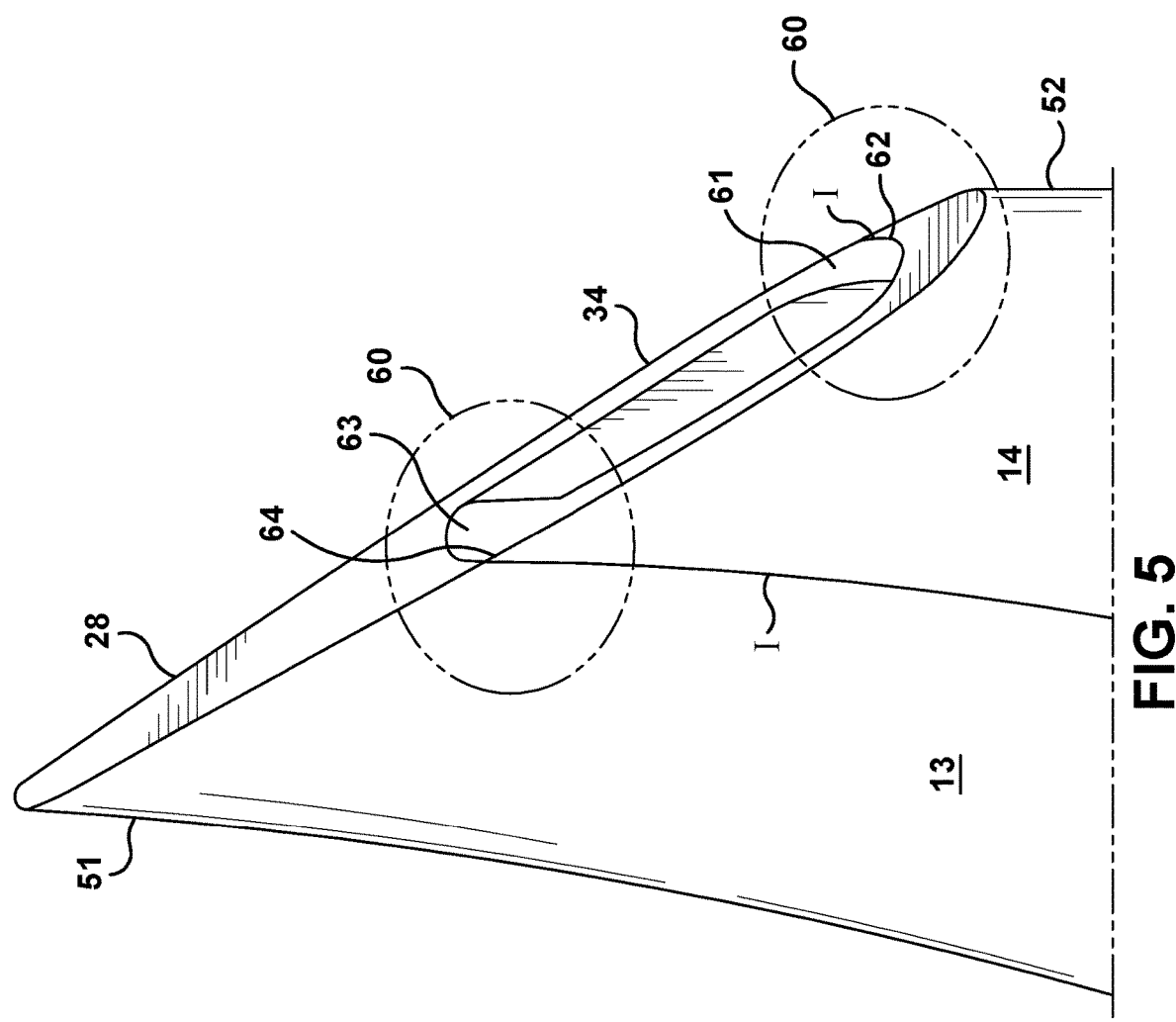
FIG. 5 is a perspective view of a tip cap area of a blade in accordance with aspects of the disclosure.

Airfoil 15 in FIGS. 3-5 is provided in two parts, parts 13, 14. As discussed hereinafter, the airfoil 15 can be formed from these two parts, or more than two parts, that fit together in a preloaded engagement, and are retained together to form airfoil 15 (as described hereinafter). As illustrated in FIGS. 3-5, the two parts 13, 14 of airfoil 15 fit together in an interference fit. The two parts 13, 14 have dimensions that when positioned together in base 21, the parts 13, 14 preload against each other at their contacting edges and points at outer tip 28. The term "preload" here means that the overall dimensions of each part 13, 14 are such that parts 13, 14 when assembled in base 21 are essentially forced against each other in an interlocking manner. Moreover, each part 13, 14 can include interlocking structures (to be described hereinafter with reference to FIG. 5) to securely form airfoil 15 and blade 12 in base 21. The interlocking of parts 13, 14, when assembled with base 21 to form the airfoil 15, provide airfoil 15 as a substantially one-piece, integral, unitary blade 12.

With reference to FIG. 5, details of interlocking structure will now be described. As best seen, part 13 includes the trailing edge 51 while part 14 includes the leading edge 51. Interlocking structures 60 are provided at contacting edges or engaging sides or joints I of parts 13, 14 at outer tip 28 and joints I, in particular at cooling hole cavities 34. Interlocking structures 60 preload the parts together, retain the parts 13, 14 together and provide the interference fit between parts 13, 14 for the entire length of each joint I. Interlocking structures 60 are provided at opposing sides of the cooling hole. One interlocking structure 60 is illustrated in detail in FIG. 5. For discussion purposes, only a "first" interlocking structure 60 will be described, however, similar features are provided on any second, third, or further interlocking structure 60 as embodied by the disclosure.

Each interlocking structure 60 comprises an enlarged, bulbous or rounded male portion 61 that fits in a close tight pressure or interference engagement, in other words an interference fit or compressive fit, with female portion 62. Portions 61 and 62 fit so closely with each other that there is little if any freedom or play therebetween all along joints I.

Thus, parts 13, 14 are joined to form airfoil 15, and airfoil 15 is fit into base 21 to form blade 12. The fit is such that parts 13, 14 and base 21 are under a tight interference fit. The frictionally joined edges at the interference fit permits parts 13, 14 and base 21 to slightly move with respect to each other during turbine operation, enabling frictional damping of the blade 12. However, this movement does not alter the integrity of blade 12, nor does it permit separation of parts 13, 14 from each other or base 21.

In FIG. 5, part 13 defines a male portion 61 that interfits with female portion 62 of part 14 at the joint I closest to the leading edge 52 to preload the parts together, retain the parts 13, 14 together, and provide the interference fit. Male and female portions 61 and 62 do not flex and deform to hold one another. Also in FIG. 5, at the joint I that is nearer to trailing edge 51, part 14 defines a male portion 63 that interfits with female portion 64 of part 13 at the joint I.

In the illustrated configurations, parts 13, 14 may slide relative to each other to fit together, either in a vertical relation to their longitudinal axis (out of page for FIG. 3) or brought laterally to each other (coextensive to the page for FIG. 5), as long as respective male and female portions 61, 62 fit together in a tight interference fit.

Figure 6:
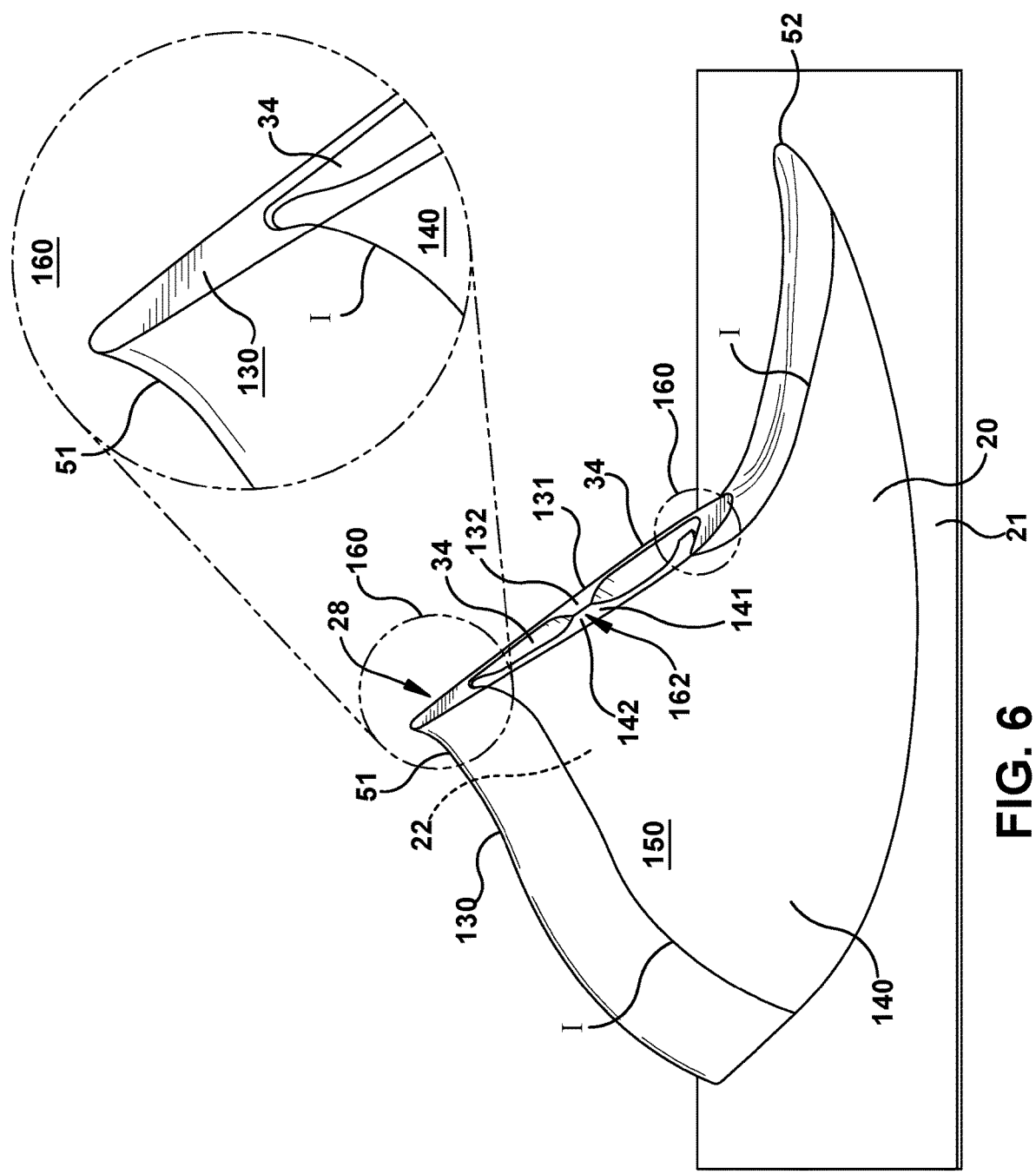
FIG. 6 is a side perspective view of another blade having a tip in accordance with aspects of the disclosure.

FIGS. 6 and 7 set forth another aspect of the embodiments. As noted above, like reference numbers are used to represent like elements. In FIGS. 6 and 7, an unshrouded blade 112 includes an airfoil 150 on base 21. Parts 130, 140 have dimensions that when positioned in the base 21, preload against each other at their contacting edges and points at outer tip 28. The preload retains the parts 130, 140 together and provides the interference fit. Airfoil 150 includes two parts 130, 140 joined to form airfoil 150, and airfoil 150 is fit into base 21, the fit is such that parts 130, 140 and base 21 are under a tight interference fit.

Moreover, in FIG. 6, airfoil 150 includes at least one cavity, and in these figures, there are two cavities 34 that can be machined therein. Between machined cavities 34, which can be interconnected to cooling flow channels 30 (internal of the airfoil 150), parts 130, 140 contact each other at contact face 162 and interlocking structures 160. Interlocking structures 160 interconnect parts 130, 140 in a similar manner as structures 60, above. Contact face 162 is between cavities 34, where parts 130, 140 abut. The contact face 162 defines side-to-side abutment of parts 130, 140, and need not include any joining configuration therebetween. However, contact face 162 can include any of the interlocking structures, as described herein and embodied by the disclosure.

Contact face 162 extends the vertical length of airfoil 150 from outer tip 28 to base 21 to permit frictional movement between parts 130, 140 as damping may demand. The contact face 162, together with interlocking structures 160, preloads the parts together, retains the parts 130, 140 together and provide the interference fit, and also provides airfoil 150 of FIGS. 6 and 7 with frictional damping along the entire span of the airfoil 150 at at least three contact locations and distinct damping facilitating locations.

Interlocking structures 160 provide an interference fit between parts 130, 140, preloads the parts together, and retains the parts 130, 140 for the entire length of each joint I. In a similar manner as above, connection of parts 130, 140 at interlocking structures 160 enables damping of the airfoil 150 at interlocking structures 160. With part 140 entirely positioned on the suction side of the airfoil 150, as in FIG. 6, part 140 acts as a damper panel. In other words, if airfoil 150 undergoes vibrations, stress, or other forces that necessitate damping, part 140 by virtue of being a damper panel on one side of the airfoil 150 and with three contact locations for frictional damping, enhances the ability of airfoil 150 to be damped.

Interlocking structures 160 in this embodiment f the disclosure are essentially similar to interlocking structures 60 of FIGS. 3-5. Accordingly, a further description of interlocking structures 160 is omitted for brevity.

Parts 130, 140 each have respective projections 131, 141. Each projection 131, 141 has an extending lip 132, 142 that are aligned with each other at contact face 162. Thus, when interlocking structures 160 between parts 130, 140 are engaged as illustrated in FIG. 6, the lips 132, 142 of projections 131, 141 at contact face 162 abut against each other retaining parts 130, 140 together and providing the interference fit. Engagement of lips 132, 142 of projections 131, 141 is a frictional contact engagement at interface 162. This frictional contact engagement at contact face 162 permits minor sliding, and thus frictional damping movement therebetween. This frictional contact damping at contact face 162 is in addition to frictional damping at interlocking structures 160.

Accordingly, the blade 112 of FIGS. 6 and 7 have three points of frictional damping. Thus, if the blade 112 undergoes vibrations, stress, movement or the like undue stresses, the damping at one or more of contact face 162 and interlocking structures 160 acts to mitigate damage to the blade 112.

As illustrated in FIGS. 6 and 7, part 130 includes both the leading edge 51 and the trailing edge 52 of the blade 112. Moreover part 130 forms the entire pressure side (backside of blade 112 in FIG. 6) of blade 112, as well as leading and trailing edge segments of suction side. Part 140, which is effectively a damping panel, forms neither the leading edge 51 and trailing edge 52 of blade 112, and only a portion of the suction side of blade 112.

Further, in the embodiments of FIGS. 6 and 7, parts 130, 140 facilitate formation of internal cooling flow channels 30 in blade 112. As in earlier embodiments, internal cooling flow channels 30 discharge through corresponding cooling hole cavities 34 at tip cap 36. With separation of parts 130, 140, internal cooling flow channels 30 and cooling hole cavities 34 are able to be formed into parts 130, 140 in an easier process if there were not separate parts. For example, and in no way limiting of the embodiments herein, internal cooling flow channels 30 and cooling hole cavities 34 can be machined in to parts 130, 140 with ready access to mid areas of parts 130, 140. Machining of internal cooling flow channels 30 and cooling hole cavities 34 can be by drilling, milling, reaming, computer numerical control (CNC) machining, laser cutting, electric discharge machining (EDM), abrasive machining, and other suitable machining processes, known now or later developed.

Contact face 162 and interlocking structures 160 are located along the joining joint I between parts 130, 140 at outer tip 28. Moreover, contact face 162 and interlocking structures 160 at tip cap 36 are formed generally on a mean camber line for blade 112 to which joint I generally leads. Further, in accordance with an aspect of the embodiments, part 130 and base 21 may be formed either separate or as a unitary entity, accordingly providing enhanced structural integrity to the blade 112, even before the interference fit of part 140 with part 130 and base 21.

Figure 9:
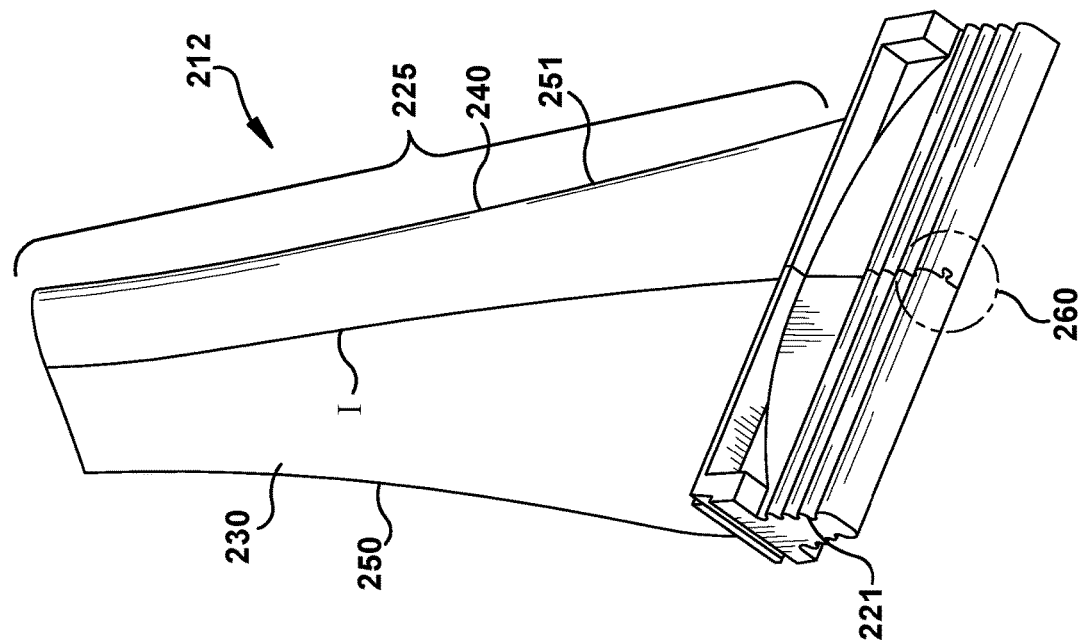
FIG. 9 is a side perspective view of the blade of FIG. 8 in accordance with aspects of the disclosure.
Figure 8:
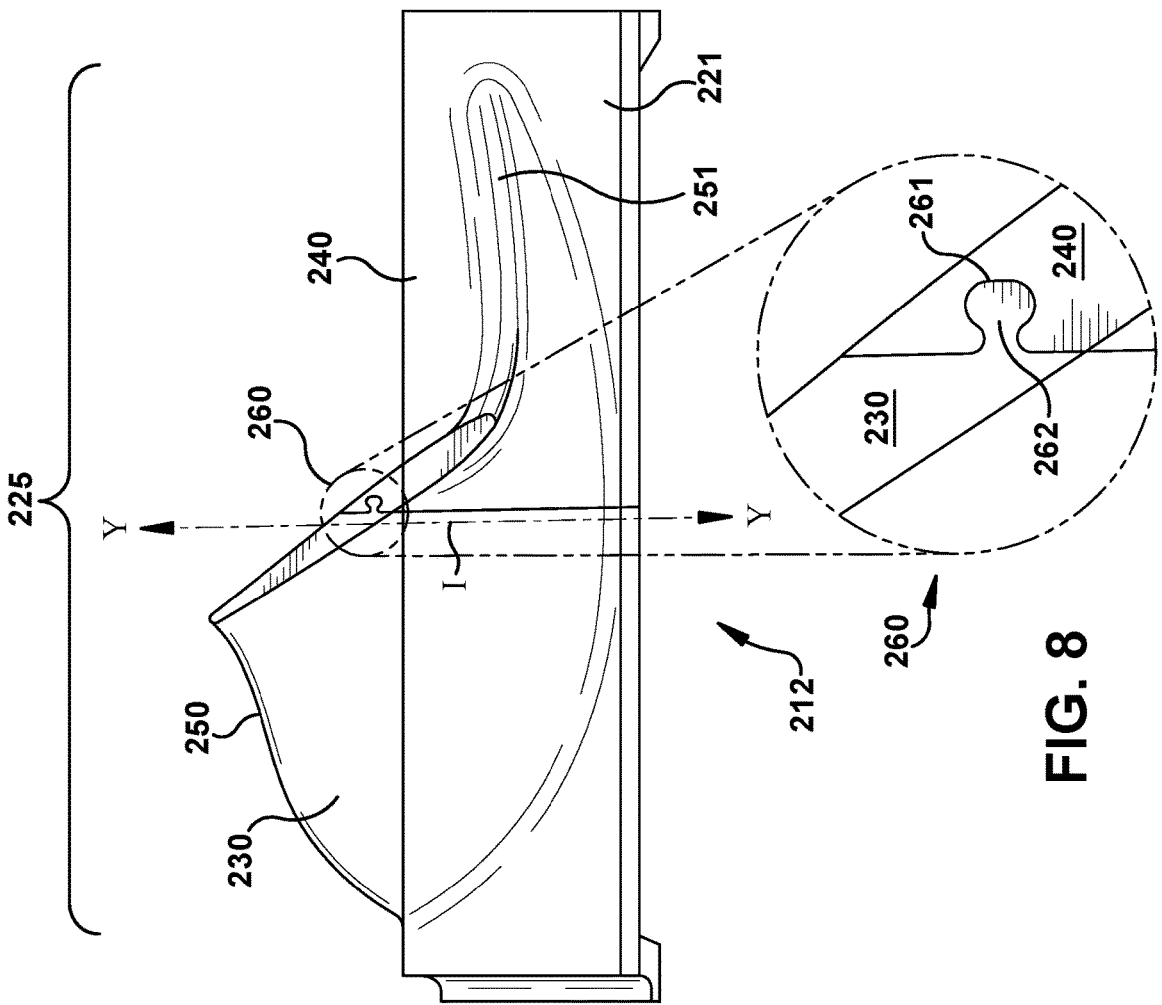
FIG. 8 is a top perspective view of yet another blade in accordance with aspects of the disclosure.

A further aspect of the embodiments is illustrated in FIGS. 8 and 9. Again, like reference numbers are used to represent like elements.

In FIGS. 8 and 9, an unshrouded blade 212 includes airfoil 225 on base 221. Airfoil 225 includes two parts, 230 and 240. In this embodiment of the disclosure, parts 230 and 240 form the leading edge 250 and trailing edge 251 of the blade 212.

With reference to FIGS. 8 and 9, blade 212 is divided into parts 230 and 240 along a vertical direction of the blade 212. While the figures illustrate blade 212 essentially divided in half (50%/50%), this characterization is merely illustrative of the multitude of possible essentially vertical divisions of the blade 212. The scope of the embodiments envisions blade 212 divided into parts 230, 240 that can range from 1-99% for part 230, and 99%-1% for part 240 of the blade 212, respectively.

As illustrated, blade 212 includes airfoil 225 that extends from base 221. The airfoil 225 and base 221 are formed in parts 230 and 240, so each respective part includes a portion of base 221 and a portion of airfoil 225. As illustrated here, each part 230, 240 has integrally formed parts of base 221 and airfoil 225.

As in FIGS. 8 and 9, leading edge 250 and adjoining parts of the suction and pressure sides of blade 212 are formed in part 230. Trailing edge 251 and adjoining parts of the suction and pressure sides of blade 212 are in part 240. The joint I between parts 230, 240 includes a frictional interference fit 260 that preloads the parts together, retains the parts 230, 240 together and provide the interference fit.

Frictional interference fit 260 provides a tight fit that also enables slight and minor damping actions when blade 212 undergoes movement, vibrations and the like. Damping will mitigate possible harmful stress and vibrations on blade 220 during turbine operation. As illustrated, part 240 includes a female recess 261 to receive male projection 262 on part 230. The frictional interference fit 260 includes male projection 262 on part 230, with female recess 261 on part 240, as illustrated in FIGS. 8 and 9, however, location of parts in frictional interference fit 260 may be switched. Thus, male projection 262 can be on part 240, with female recess 261 on part 230.

With this configuration of the frictional interference fit 260 that retains the parts 230, 240 together, parts 230 and 240 can be moved vertically with respect to each other to mate parts 230, 240. By moving parts 230, 240 vertically, one with respect to the other or each together at joint I with the other along direction indicated by arrow Y (FIG. 8), parts 230 and 240 join to form blade 212. Interference fit 260 permits movement between parts 230 and 240 during assembly and slight movement thereafter for damping. In particular, when blade 212 is inserted in rotor wheel 116 of the turbine, interlocking of base 221 and the receiving cavity in wheel 116 for blade 212 prevents movement of parts 230, 240 other than slight movement therebetween for frictional damping.

Furthermore, with respect to the embodiment of FIGS. 8 and 9, the shapes of frictional interference fit 260 male projection 262 and female recess 261 are merely illustrative of engaging elements, such as the illustrated male and female elements. The shapes of frictional interference fit 260 male projection 262 and female recess 261 (in jigsaw puzzle terms a "tab" and "blank") are merely illustrative of engaging male and female elements. Rather than the circular projection and recess as illustrated, polygonal engaging male and female elements, dovetail engaging male and female elements, lap fit joints, and other configurations of engaging male and female elements now known or hereinafter developed.

FIGS. 10 and 11 set forth another aspect of embodiments. Again, like reference numbers are used to represent like elements. In a similar context of FIGS. 8 and 9, an unshrouded blade 312 includes airfoil 320 on base 321. Blade 312 and airfoil 320 includes four parts, 330, 340, 350, and 360. In this embodiment, part 330 forms portions of leading edge 310 and part 360 forms trailing edge 311. Tip cap 336 includes portions of parts 330, 340, 350, 360. Base 321 includes portions of four parts 330, 340, 350, 360.

Blade 312 includes four parts, 330, 331, 332, and 333, with joints I between all being generally along a vertical direction of blade 312. While the figures illustrate the division of blade 312 essentially dividing blade 312 into four separate portions 330, 340, 350, 360, this characterization is merely illustrative of the multitude of possible vertical joints I and their locations in blade 312.

Each part 330, 340, 350, 360 includes integrally formed parts of base 321 and airfoil 320. Respective base 321 and airfoil 320 portions of each part 330, 340, 350, 360 can be cast together; or formed separately and joined to form the parts 330, 340, 350, 360; formed separately then provided with interlocking structures 370 (described herein) to interlock and form parts 330, 340, 350, 360 therein; or formed as the entire blade 312 and then split into parts 330, 340, 350, 360 by any appropriate means now known or hereinafter developed.

As shown in FIGS. 10 and 11, joints I between portions 330, 340, 350, 360 can include a frictional interference fit or interlocking structure 370 that retains the parts 330, 340, 350, 360 together and provide the interference fit. Frictional interference fit or interlocking structure 370, as embodied by the disclosure, can include any or all of the frictional interference fit or interlocking structures, 60, 160, 260, or others within the scope of the disclosure. The frictional interference fit or interlocking structure 370 provides a fit with slight freedom of movement for damping. Therefore, as discussed above, damping occurs when blade 312 undergoes stress, vibrations and the like, via the preloaded parts 330, 340, 350, 360 and each interlocking structure 370.

In the aspect of the disclosure of FIGS. 10 and 11, part 330 includes part 331 that forms part of leading edge 310 of airfoil 320 while part 332 forms part of base 321 at the leading edge of blade 312. Part 331 forms part of airfoil 320 along both suction side 313 and pressure side 314 of blade 312 (FIG. 10). Also, as illustrated, part 330 abuts on parts 340 and 350 in airfoil 320. Further, part 332 abuts on base parts 342 and 352 in base 321.

Also in FIGS. 10 and 11, part 340 includes part 341 that forms part of airfoil 320 while part 342 forms part of base 321 along suction side 313 of the blade 312. Also, as illustrated, part 341 abuts parts 331 and 351 of airfoil 350, while part 341 of base 321 abuts base parts 332 and 352.

In the illustrated configuration of FIGS. 10 and 11, part 350 includes airfoil part 351 that extends from near, while not at, leading edge 310 of airfoil 320. Part 352 forms part of base 321 along pressure side 314 of blade 312. Part 350 extends from part 330 to part 360, with the base part 353 extending from base part 332 to base part 362, and contacting base part 342. Part 352 includes part of pressure side 314 of the blade 312, abuts airfoil parts 331, 341, and 361 in airfoil 320 of blade 312.

In the illustrated configuration of FIGS. 10 and 11, part 360 includes parts 361 and 362 at trailing edge 311 of airfoil 312. Part 362 forms base part at trailing edge 311 in base 321 of blade 312. Part 361 forms part of airfoil 320 along both suction side 313 and pressure side 314 of blade 312. Part 360 extends from part 340 and part 350, with the base part 362 extending from base parts 341 and 351. In addition, part 360 includes part of pressure side 313 and suction side 314 of blade 312, and abuts on airfoil parts 341 and 351 in the airfoil 320.

Further, tip 328 includes portions 333, 343, 353, and 363 of each respective part 330, 340, 350, and 360. This aspect of the embodiments is best illustrated in the exploded view of blade 312 in FIG. 11.

Figure 14:
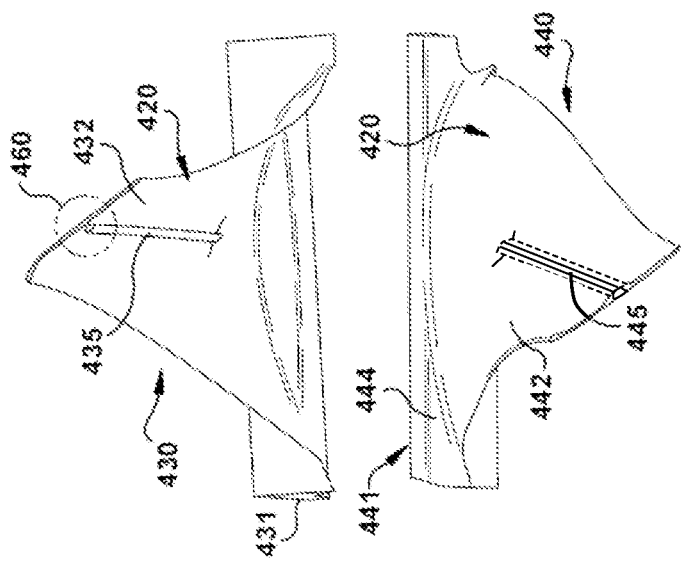
FIG. 14 is an exploded perspective view of the blade of FIG. 12 in accordance with aspects of the disclosure.
Figure 13:
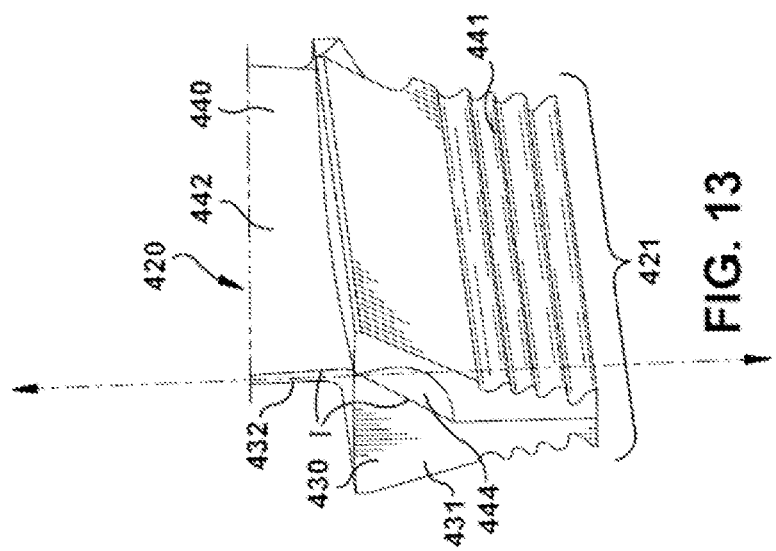
FIG. 13 is a partial perspective view of the blade of FIG. 12 in accordance with aspects of the disclosure.
Figure 12:
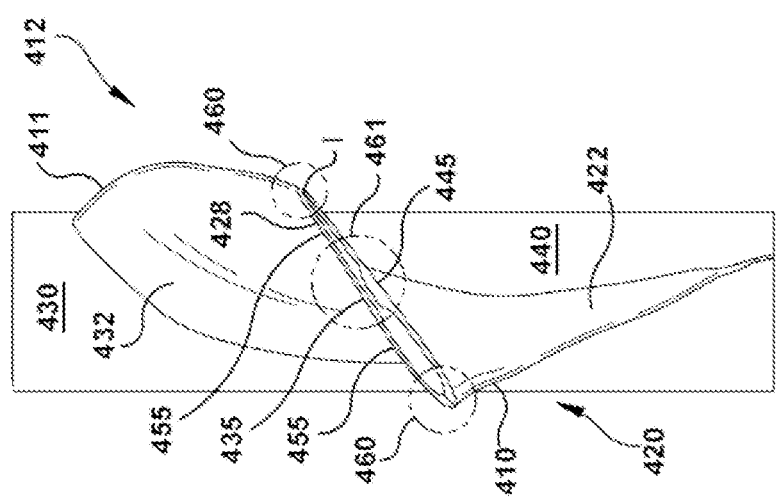
FIG. 12 is a top perspective view of another blade in accordance with aspects of the disclosure.

FIGS. 12-14 illustrate a further embodiment of the disclosure. In the figures, blade 412 is divided into parts 430 and 440 along a vertical direction Y along mean camber line of blade 412.

As illustrated, blade 412 includes airfoil 420 that extends from base 421. The airfoil 420 and base 421 are formed in parts 430 and 440 so each part includes base portions 431 and 441 and airfoil portions 432 and 442. As per this aspect of the embodiments, each part 430, 440 includes an integrally formed part of base 421 and airfoil 420. For example, respective portions 431 and 441, and 432 and 442 can be cast together as one part; or formed separately and joined to form the parts 430, 440; formed unitarily and then split to form the parts 430, 440.

As shown in FIGS. 12-14, leading edge 410 and trailing edge 411 are formed in both parts 430 and 440, respectively. This perspective is best illustrated in the top elevational view of FIG. 12. The joint I between parts 430, 440 essentially splits airfoil 420 along its mean camber line and follows mean camber line into base 421 (FIG. 13). The joint I also preloads the parts together, retains parts 430, 440 together, provides the interference fit and provides a preload configuration for blade 412. Blade 412 further includes cooling holes 455 extending from cooling passages (not illustrated) at tip cap 428. The blade includes a frictional interference fit 460 at leading edge 410 and trailing edge

411. Moreover, a frictional interference fit 461 is positioned proximate the midpoint of the mean camber line between cooling holes 455.

Frictional interference fit or interlocking structure 460, as embodied by the disclosure, can include any or all of the frictional interference fit or interlocking structures, 60, 160, 260, 360, or others within the scope of the disclosure. The frictional interference fit or interlocking structure 460 preloads the parts together, retains parts 430, 440 together and provides the interference fit with slight freedom of movement when blade 412 is not in wheel 116. Therefore, as discussed above, damping occurs when blade 412 undergoes stress, vibrations and the like. Moreover, as described with frictional interference fit or interlocking structures, 60, 160, 260, when blade 412 is fit into wheel 116, blade 412 enables damping when the blade 412 undergoes stress, vibrations, and the like.

Frictional interference fit 461 can be similar to the frictional interference fit 260 of FIGS. 8 and 9. Frictional interference fit 461 provides a tight fit that also enables slight and minor damping actions when blade 412 undergoes movement, vibrations, and the like. As illustrated, frictional interference fit 461 includes male projection 435 on part 430, with female recess 445 on part 440. However, location of parts in frictional interference fit 461 may be switched so male projection 435 is on part 440, with female recess 445 on part 430.

With this configuration of the frictional interference fit 461, parts 430, 440 can be moved vertically with respect to each other to mate parts 430, 440. By moving parts 430, 440 vertically, one with respect to the other or each together with the other along the direction indicated by the arrow, parts 430, 440 join to form blade 412. Interference fit 461 permits slight damping movement between parts 430, 440 during assembly and turbine operation. In particular, when blade 412 is inserted in rotor wheel 116 of the turbine, interlocking of base 421 into wheel 116 for blade 412 enables slight damping movement of parts 430, 440 for frictionally damping the blade 412.

Furthermore, with respect to the embodiment, the shapes of frictional interference fit 461 male projection 435 and female recess 445 are merely illustrative of engaging elements, such as the illustrated male and female elements. The shapes of frictional interference fit male projection and female recess (in jigsaw puzzle terms a "tab" and "blank") are merely illustrative of engaging male and female elements. Rather than the circular projection and recess as illustrated, polygonal engaging male and female elements, dovetail engaging male and female elements, lap fit joints, and other configurations of engaging male and female elements now known or hereinafter developed.

Further, as best illustrated in FIG. 13, part 440 may include a cut-out 444 in base 421. The cut-out 444 may reduce the overall weight of part 440 and thus the overall weight of blade 412. As illustrated, cut-out 444 is generally arcuate, and follows the mean camber line of airfoil 420 from leading edge 410 to trailing edge 411 of blade 412.

Output and efficiency of gas turbine engines improve as the size of the engine and, and more specifically, the amount of air able to pass through it increase. The size of the engine, however, may be limited by the operable length of the turbine blades, with longer turbine blades enabling enlargement of the flow path through the engine. Longer blades, though, incur increased mechanical loads, which may place further demands on the blades and the disc that holds them. Longer blades also decrease the natural vibrational frequencies of the blades during operation, which increases the vibratory response of the blades. This additional vibratory load places even greater demands on blade configuration, which may limit life of the component and, in some cases, may cause vibratory loads in the turbine engine. One way to address the vibratory load of longer blades is through the use of shrouds that connect adjacent blades to each other.

One way to modify a blade in light of loads thereon is to position a shroud lower on the airfoil of the blade. That is, instead of adding the shroud to the tip of the blade, the shroud is positioned near the middle radial portion of the airfoil. As used herein, such a shroud will be referred to as a "snubber shroud." At this lower (or more inboard) radius, the mass of the shroud causes a reduced level of stress to the blade. However, this type of snubber shroud may leave a portion of the airfoil of the blade unrestrained (i.e., that portion of the airfoil that extends outboard of the snubber shroud). This cantilevered portion of the airfoil can result in lower frequency vibration and increased vibratory loads.

Accordingly, a further aspect of the embodiments is set forth in FIGS. 15-17. In this embodiment, blade 512 is intended for use in large turbines. Blade 512 (partially illustrated without a base for ease of illustration) may include a snubber shroud 525 for, but not limited to, stability and operations purposes. Snubber shroud 525 is provided on airfoil 520 and extends from airfoil 520 at both the suction side and pressure side, respectively. Snubber shrouds 525 can be sized to complement and engage a corresponding snubber shroud on an adjacent turbine blade.

As illustrated in FIGS. 15, 16, and 17, airfoil 520 is formed from two parts, part 540 that is a majority of airfoil 520, and part 550 or damper panel 550 is a minority of airfoil 520. Damper panel 550 is connected to one side of airfoil 520, here suction side 521 in slot 545 (FIG. 17) formed in a complementary configuration as damper panel 550. Alternatively, damper panel 550 can be on pressure side 522 of airfoil 520.

Damper panel 550 extends partially down the length of airfoil 520 and terminates at snubber shroud 525. In this embodiment, frictional interference fit 560 secures damper panel 550 to airfoil 520 at joints I in a preloaded configuration, retains parts 540, 550 together, and provides the interference fit of blade 512.

Frictional interference fit 560, as embodied by the disclosure, can include any or all of the frictional interference fit or interlocking structures, 60, 160, 260, 360, 460, or others within the scope of the disclosure. In accordance with the illustrated embodiment, frictional interference fit 560 provides a slight damping movement in slot 545. Therefore, as discussed above, damping occurs when airfoil 512 undergoes stress, vibrations and the like, and damping panel 550 permits frictional damping between itself and part 540 of the airfoil.

However, as described with frictional interference fit or interlocking structures, 60, 160, 260, 360, 460, 560, or others within the scope of the disclosure when blade 512 of this embodiment is fit into wheel 116, the configuration of blade 512 enables damping when the blade 512 undergoes stress, vibrations and the like.

As illustrated, frictional interference fit 560 includes male projection 555 on damping panel 550. Male projection 555 interacts with in slot 545 on part 540. Male projection 555 and slot 545 are complementary in shape, provide a snug friction fit, and permit slight frictional damping movement therebetween during operation of a turbine. While male projection 555 is on damping panel 550 and slot 545 is on part 540, location of parts in frictional interference fit 560 may be switched so male projections 555 on part 440, with slot.

With this configuration of the frictional interference fit 560, parts 540, 550 can be moved vertically in slot 545 with respect to each other to mate parts 540, 550 defining joint I. By moving parts 540, 550 one with respect to the other or each together with the other along direction indicated by arrow Y, parts 540, 550 join to form blade 512. Interference fit 560 at joint I enables movement between parts 540, 550 during assembly and slight damping movement thereafter. In particular, when blade 512 is inserted in rotor wheel 116 of the turbine, interlocking of the base (not illustrated in these figures) and receiving cavity in wheel 116 prevents movement of parts 540, 550 other than sight frictionally damping movement.

Furthermore, with respect to the embodiment, the shapes of frictional interference fit 560 male projection and female recess are merely illustrative of engaging elements, such as the illustrated male and female elements. The shapes of frictional interference fit male projection and female recess (in jigsaw puzzle terms a "tab" and "blank") are merely illustrative of engaging male and female elements. Rather than the circular projection and recess as illustrated, polygonal engaging male and female elements, dovetail engaging male and female elements, lap fit joints, and other configurations of engaging male and female elements now known or hereinafter developed.

An additional securing feature is provided for the damper panel 550 to be held in slot 545 of part 540 of the airfoil when blade 512 includes snubber shroud 525. At least one retention pin 526 may be provided extending through at least one retention pin aperture 527 in snubber shroud 525. Respective retention pins 526 are sized to aligned with an exterior surface of airfoil 512, here snubber shroud 525, to provide an essentially co-planar and smooth surface.

Damper panel 550 can comprise at least one damper panel through-hole 528. Each damper panel through-hole 528 is aligned with the at least one retention pin aperture 527. Accordingly, retention pin 526 inserted into the at least one retention pin aperture 527 in snubber shroud 525 will extend into and through airfoil 520, through and exit damper panel through-hole 528 in damper panel 550, and extend into the opposed at least one retention pin aperture 527 on the opposing side of the airfoil in the snubber shroud 525. Accordingly in operation, as blade 512 rotates, the frictional contact of damper panel 550 will result in frictional damping of the parts and, hold damper panel 550 in slot 545. The engagement of at least one retention pin 526 with snubber shroud 525 provides additional securing therebetween. In operation, the at least one retention pin 526 may have frictional contact with and slight motion relative to the through-hole 528 in the damper panel 550 and the retention pin aperture in the airfoil 520, providing additional friction damping of the blade 512.

Several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical disclosure, and to enable others of ordinary skill in the art to understand the disclosure for various embodiments with various modifications as are suited to the particular use contemplated.

What is claimed is:

1. A blade, the blade comprising:
a base;
an airfoil, the airfoil including a tip cap, a pressure sidewall and a suction sidewall extending axially between corresponding leading and trailing edges and radially between the base and the tip cap,
the blade, including the airfoil and the base, being formed in at least two airfoil parts, each of the at least two airfoil parts including contacting edges engaging other respective contacting edges, the contacting edges defining a joint for preloading each of the at least two parts with each other and with the base, the at least two airfoil parts each including a projection, each projection of the at least two airfoil parts including an extending lip aligned with each other and each projection of the at least two airfoil parts abutting at a contact face; and wherein the at least two airfoil parts forming the airfoil are retained to each other by an interference fit at the joint, the interference fit providing frictional damping of vibrations in the blade during blade operation; wherein the interference fit includes a first bulbous male portion on one part of the at least two parts and a first female part in another part of the at least two parts, and the first male portion and the first female portion fit closely together in the interference fit.

2. A blade according to claim 1, wherein the blade further includes at least one cooling passage exiting the blade at the tip cap at a cooling hole.

3. A blade according to claim 2, wherein the first male portion and the first female portion are each positioned on the cooling hole.

4. A blade according to claim 3, wherein the interference fit further includes a second bulbous male portion in the another part of the at least two parts and a second female part in the one part of the at least two parts, wherein the second male portion and the second female portion are each positioned on the cooling hole opposite the first male portion and the first female portion, and the second male portion and the second female portion fit closely together in the interference fit.

5. A blade according to claim 4, wherein the airfoil includes two cooling holes at the tip cap, the interference fit further including projections including mating lips, the projections and the mating lips disposed between the two cooling holes at the tip cap, the interference fit including a male portion on one part of the at least two parts and a female part in another part of the at least two parts, wherein the male portion and the female portion are each positioned between the cooling holes, and the male portion and the female portion fit closely together in the interference fit.

6. A blade according to claim 3, wherein the interference fit includes the first bulbous male portion on one part of the at least two parts and the first female part in another part of the at least two parts, and the first male portion and the first female portion fit closely together in the interference fit.

7. A blade according to claim 1, wherein the blade includes two airfoil parts.

8. A blade according to claim 7, wherein a first part of the two parts forms the leading edge, and a second part of the two parts forms the trailing edge.

9. A blade according to claim 7, wherein one part of the two parts forms both the leading edge and the trailing edge.

10. A blade according to claim 7, wherein a portion of each of the first part and the second part of the two parts form a portion of the leading edge and form a portion of the trailing edge.

11. A blade according to claim 10, wherein the first part forming the leading edge and the trailing edge defines a slot on one of the pressure sidewall and suction sidewall, the second part of the airfoil disposed in the slot in the interference fit at the joint, the interference fit being capable of frictional damping of vibrations in the blade during blade operation.

12. A blade according to claim 1, wherein the base of the blade is formed in at least two base parts, each of the at least two base parts being formed together with a corresponding part of the at least two airfoil parts.

13. A blade according to claim 12, wherein the blade includes two airfoil parts connected to two base parts.

14. A blade according to claim 12, wherein the blade includes four airfoil parts connected to four base parts, each of the four parts forming the blade and including contacting edges defining the joint with the interference fit at respective joints.

15. A blade according to claim 14, wherein a first part of the four parts includes the leading edge of the airfoil, and a fourth part of the airfoil includes the trailing edge of the airfoil.

16. A blade according to claim 14, wherein each of the four parts form the tip cap of the airfoil.

17. A turbine engine, the turbine engine comprising:
a blade including:
a base;
an airfoil, the airfoil including a tip cap, a pressure sidewall and a suction sidewall extending axially between corresponding leading and trailing edges and radially between the base and the tip cap,
the blade, including the airfoil and base, being formed in at least two airfoil parts, each of the two airfoil parts including contacting edges engaging each other respective contacting edges, the contacting edges defining a joint for preloading each of the at least two parts with each other and with the base, the at least two airfoil parts each including a projection, each projection of the at least two airfoil parts including an extending lip aligned with each other and each projection of the at least two airfoil parts abutting at a contact face; and
wherein the at least two airfoil parts forming the airfoil being retained to each other by an interference fit at the joint, the interference fit providing frictional damping of vibrations in the blade during turbine engine operation; wherein the interference fit includes a first bulbous male portion on one part of the at least two parts and a first female part in another part of the at least two parts, and the first male portion and the first female portion fit closely together in the interference fit.

18. A turbine engine according to claim 17, wherein the base of the blade includes at least two base parts, each of the at least two base parts being formed together with a corresponding part of the at least two airfoil parts.

* * * * *